United States Patent [19]

Mendoza et al.

[11] Patent Number: 5,662,228
[45] Date of Patent: Sep. 2, 1997

[54] ANATOMY TABLE

[75] Inventors: Felipe D. Mendoza, 7009 Lattimore Dr., Dallas, Tex. 75252; Alfredo Armendariz, Lubbock, Tex.; Devin L. Brown, Lubbock, Tex.; Sam L. Montanez, Lubbock, Tex.

[73] Assignee: Felipe D. Mendoza, Dallas, Tex.

[21] Appl. No.: 592,810

[22] Filed: Jan. 26, 1996

[51] Int. Cl.⁶ .................................................. A47F 7/00
[52] U.S. Cl. .......................... 211/169; 108/28; 211/169.1; 434/262; 434/267
[58] Field of Search .................. 211/169, 169.1, 211/168, 47; 108/28; 434/262, 267

[56] References Cited

U.S. PATENT DOCUMENTS

| | | | |
|---|---|---|---|
| 1,113,698 | 10/1914 | Silvius | 211/169.1 |
| 2,123,774 | 7/1938 | Forthoffer | 211/169.1 |
| 3,295,696 | 1/1967 | Cohen | 211/47 X |
| 3,752,545 | 8/1973 | Schweizer | 211/169 X |
| 3,784,269 | 1/1974 | Frenkel | 211/169 X |
| 5,358,408 | 10/1994 | Medina | 434/267 X |
| 5,437,379 | 8/1995 | Wolf et al. | 211/169 |

OTHER PUBLICATIONS

Adjustable Clamp Company Pamphlet, "Pony®" Clamp Pads.
Adjustable Clamp Company Pamphlet, "Clamp Fixtures", Catalog No. 21.

*Primary Examiner*—Robert W. Gibson, Jr.
*Attorney, Agent, or Firm*—Baker & Botts, L.L.P.

[57] ABSTRACT

The anatomy table (10) includes a substantially flat top surface (15) with a plurality of substantially parallel grooves (30) formed in the top surface (15). A plurality of clamp assemblies (32) are each slidably engaged in one of the grooves (30) with a cross-sectional anatomy slice (12) securely fastened thereto. A plurality of rotation assemblies (52) are further provided, where each rotation assembly (52) is coupled to one clamp assembly (32) and enables a cross-sectional anatomy slice (12) to rotate to a plurality of predetermined angular viewing positions.

32 Claims, 2 Drawing Sheets

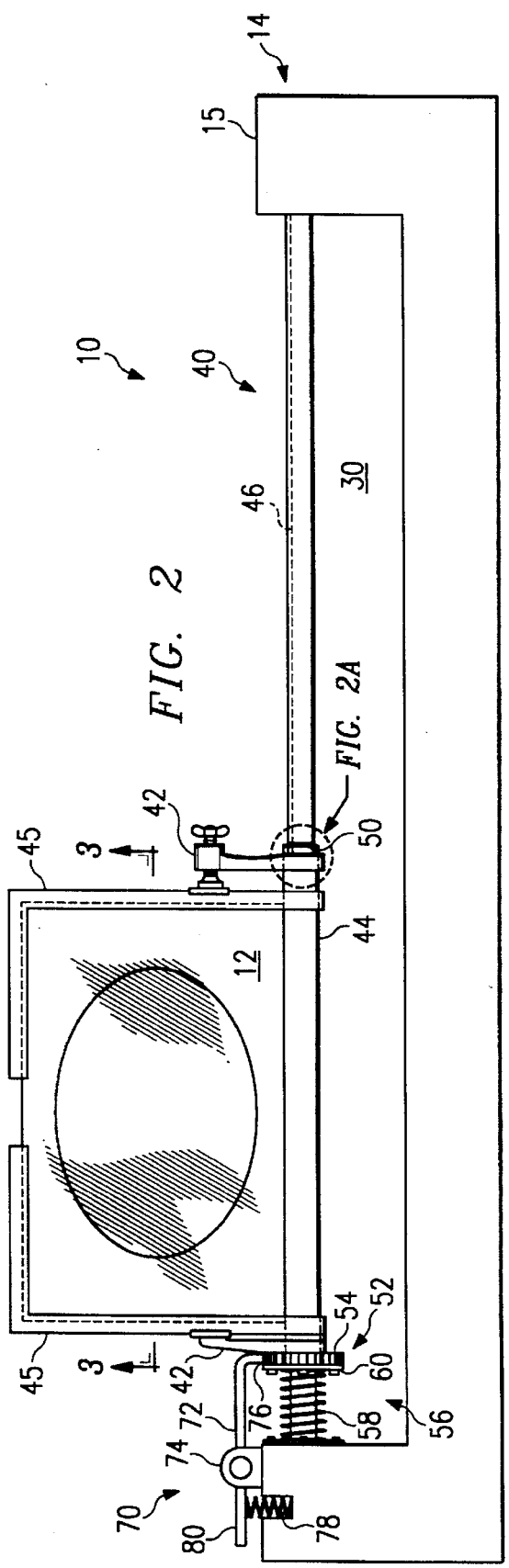
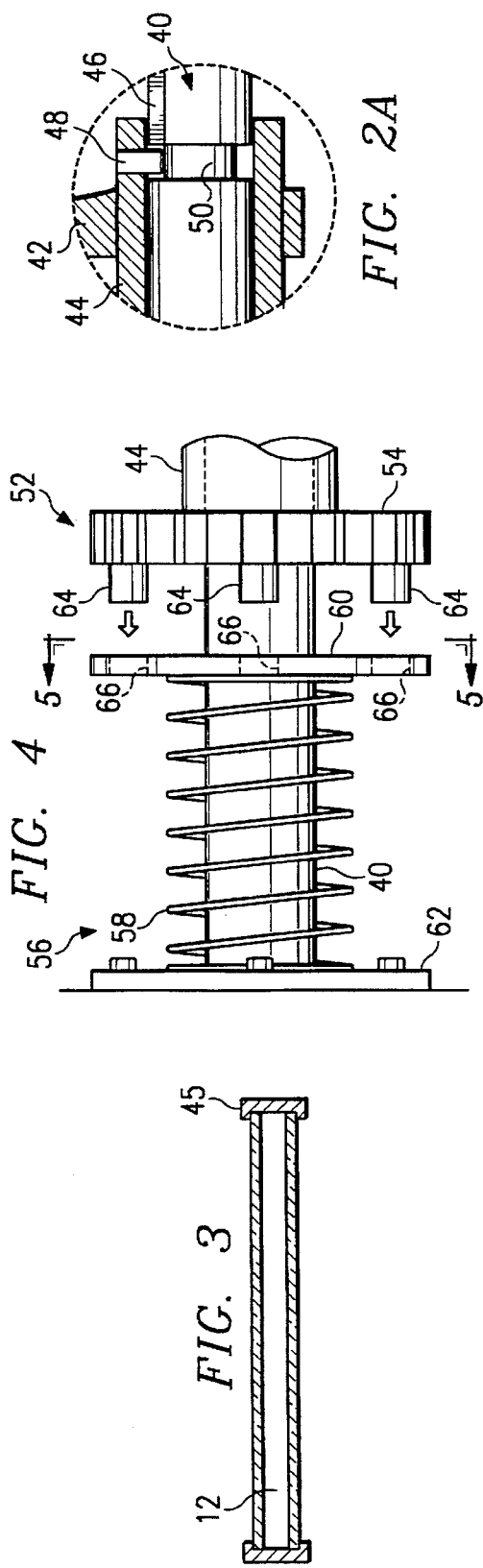

ANATOMY TABLE

TECHNICAL FIELD OF THE INVENTION

This invention is related in general to the field of medical educational devices. More particularly, the invention is related to an anatomy table.

BACKGROUND OF THE INVENTION

Medical students must understand and visualize the internal structures in the human body. X-rays and CAT scan pictures have proven a helpful tool, but it is sometimes difficult for medical students to correlate 2-dimensional black and white prints with the 3-dimensional human body. As medical teaching aides, human cadavers have been preserved by freezing, cutting into cross-sectional slices, and encasing each slice individually in a clear plastic resin. These encased cross-sectional cadaver slices have been proven invaluable in aiding the medical students to visualize the structures of the human body. These cadaver slices have also been used as base line to any abnormalities in the gross anatomy cadaver encountered in traditional dissection.

Each of the encased anatomy slices weigh approximately between twenty and thirty pounds. A complete body cadaver typically includes approximately 53 slices. It may be seen that it is a difficult task to manually handle and maneuver the weighty and bulky anatomy slices in such a manner as to provide optimal vantage viewing points of the entire cadaver as well as individual cross-sectional slices. If an individual slice is cracked or shattered, an entire cadaver would have to be replaced at considerable cost. Because of the fear of damaging the slices, the anatomy slices are typically not used effectively. In most institutions, the anatomy slices are displayed laying flat under protective glass enclosures, or kept out of reach and view of medical students altogether.

SUMMARY OF THE INVENTION

Accordingly, there is a need for a structure to store and display the anatomy slices so that each slice may be viewed individually as well as with in ensemble with the other slides of the cadaver.

In accordance with the present invention, an anatomy table is provided which eliminates or substantially reduces the disadvantages associated with how the slices are stored, displayed and handled.

In one aspect of the invention, an anatomy table includes a substantially flat top surface, and a plurality of clamp assemblies are each slidably engaged in parallel, each with a cross-sectional anatomy slice securely fastened thereto. A plurality of rotation assemblies are further provided, where each rotation assembly is coupled to one clamp assembly and enables a cross-sectional anatomy slice to rotate to a plurality of angular viewing positions.

In another aspect of the invention, a table for displaying a plurality of generally thin and flat panels is provided. The table has a substantially flat top surface, and a plurality of substantially parallel grooves may be formed in the top surface. The panels are held by a plurality of clamp assemblies each being slidably engaged in one of the grooves. A plurality of rotation assemblies are included, each being coupled to one clamp assembly and being operable for rotating a panel to a plurality of predetermined angular viewing positions. A locking assembly coupled to each rotation assembly is also provided for locking the panels into the angular viewing positions.

BRIEF DESCRIPTION OF THE DRAWINGS

For a better understanding of the present invention, reference may be made to the accompanying drawings, in which:

FIG. 2 is a cross-sectional view of an embodiment of the anatomy table showing one cadaver slice in a locked upright viewing position;

FIG. 2A is a more detailed cross-sectional view of the rotation assembly;

FIG. 3 is a cross-sectional view of a cadaver slice and C-channels along lives 3—3 in FIG. 2;

FIG. 4 is a side view of an embodiment of a rotating tension assembly; and

DETAILED DESCRIPTION OF THE INVENTION

Figure 1:
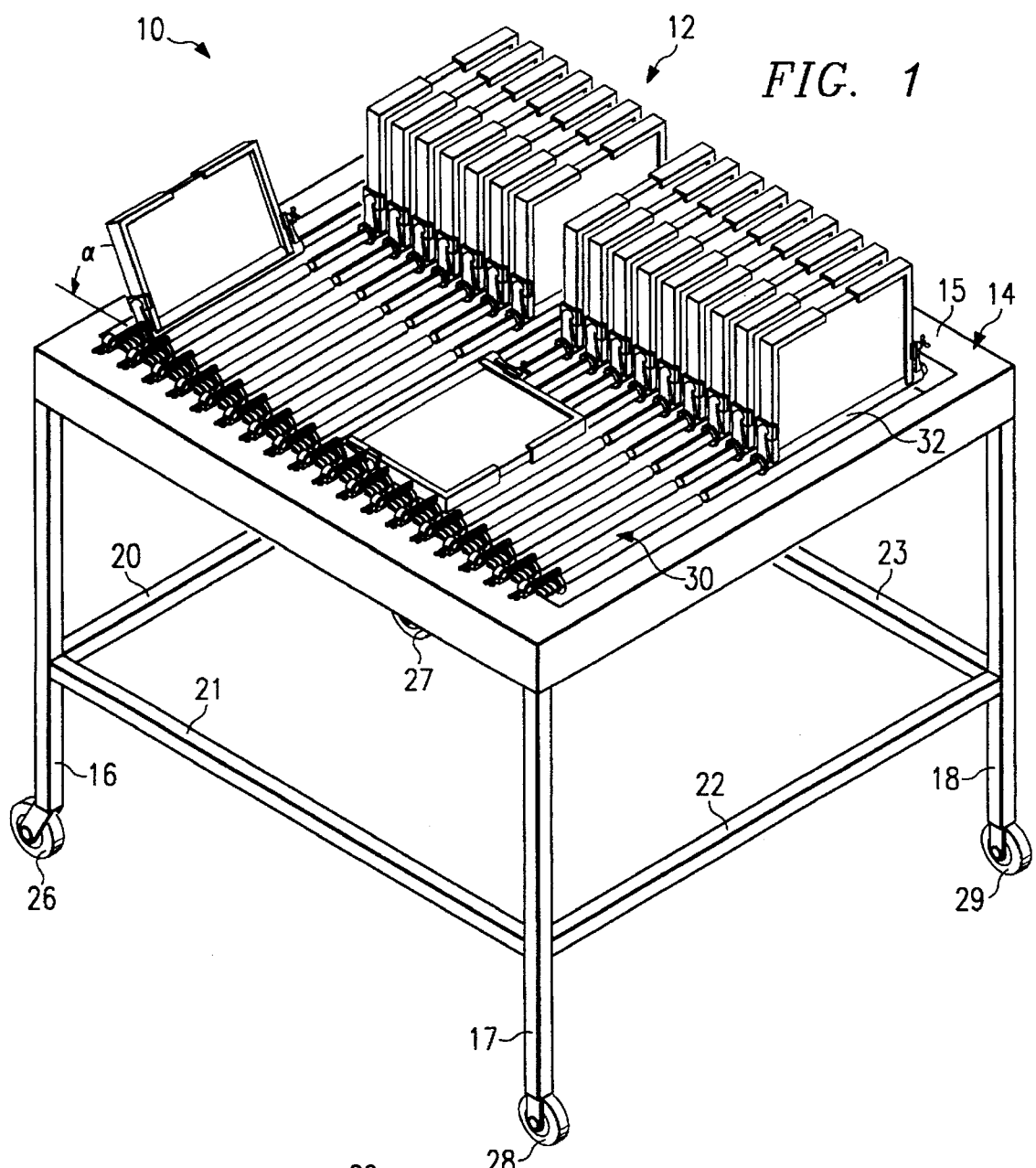
FIG. 1 is a perspective view of an embodiment of the anatomy table constructed according to the teachings of the present invention.

The preferred embodiment(s) of the present invention is (are) illustrated in FIGS. 1–5, like reference numerals being used to refer to like and corresponding parts of the various drawings.

Referring to FIG. 1, an anatomy table constructed according to the teachings of the present invention is shown indicated generally at 10. Anatomy table 10 is intended to be used to store and display a plurality of cross-sectional anatomy slices 12 of a cadaver, although it is contemplated that anatomy table 10 may also be used to display other materials of generally thin and flat configuration. Anatomy table 10 includes a substantially flat top panel 14 having a top surface 15 and at least four legs 16–18 (one hidden from view). Cross brace members 20–23 coupled between legs 16–18 may be used to increase the structural integrity of the table. Other forms of braces (not shown) known in the art of tables and the like may also be used. Lockable casters 26–29 may be included to increase the mobility of anatomy table 10. Anatomy table 10 may be constructed out of heavy woods, metals or composite materials.

Formed into top surface 15 of anatomy table 10 are a plurality of elongated grooves 30 generally in parallel alignment with one another. Anatomy table 10 preferably has a first axis along a first dimension and a second axis along a second dimension, where the first dimension (length) is longer than the second dimension (width). In a preferred embodiment, grooves 30 are formed in alignment with the second dimension and perpendicular with the first dimension. Alternatively, top surface 15 may include a predetermined generally rectangular area set at a level below top surface 15. The predetermined indented area is preferably rectangular with its sides parallel with the sides of table surface 15. Each cross-sectional anatomy slice 12 is securely fastened by a clamp assembly 32 to table 10 in each groove 30. Each clamp assembly 32 is slidably engaged in the respective groove or in parallel in the indented area so that respective cross-sectional slice 12 may slide from a first position from one side of table 10 to a second position at the other side of table 10. In general, when in the first position, cross-sectional slices 12 are in an upright position, where each slice is between approximately two to four inches apart from its neighboring slice(s). When a cross-sectional anatomy slice is slid into the second position, it may be rotated angularly by an angle, α, in either direction to facilitate viewing so that each slice may be positioned substantially flat to substantially upright. The angle α may range between approximately 10° and 170° and is selectable by the user. When multiple slices are in the second position, the angle α incline thereof may be somewhat limited by the proximity of adjacent slices.

Because a cadaver is typically separated into fifty or more slices, it may be advantageous to use more than one anatomy table 10 to hold and display all the slices to limit the overall weight of the table and maintain its mobility. If mobility is not required, all the slices may be mounted on one fixed and contiguous horizontal surface accessible to users standing or seated on both sides.

Referring to FIG. 2, a cross-sectional view of anatomy table 10 is shown. Shown in more detail is a shaft 40 securely encased in a groove 30 with its two ends attached or bolted to the sidewalls of groove 30. A cross-sectional anatomy slice 12 is slidably engaged by a clamp assembly 32 to shaft 40. Clamp assembly 32 includes an adjustable clamp fixture 42, such as PONY® clamp fixtures, mounted to the outside of a tubing 44 and used to securely clamp a cadaver slice 12 to tubing 44.

Each cadaver slice 12 may optionally be encased along its edges with a pair of C-channels 45 as also shown in FIG. 3. Holes are formed or drilled in each C-channel 45 to permit tubing 44 and shaft 40 to pass through. C-channels 45 hold cadaver slice 12 in place as it is rotated or slid along shaft 40. As shown, tubing 44 is fitted over shaft 40 with a predetermined amount of clearance between the outside diameter of shaft 40 and the inside diameter of tubing 44 to permit tubing 44 and anatomy slice 12 riding thereon to effortlessly slide along shaft 40 from the first position to the second position as described above.

Referring to both FIGS. 2 and 2A, to keep cross-sectional anatomy slice 12 in an upright position, a longitudinal keyway 46 is formed in an outside upper surface of shaft 40. A keyway pin 48 on tubing 44 engages and travels in longitudinal keyway 46 as tubing 44 and cross-sectional anatomy slice 12 slide along shaft 40. Keyway pin 48 may be constructed by press-fitting a pin through an opening made in tubing 44. A circumferential keyway 50 is further formed in the outer surface of shaft 40 at a predetermined location to enable the rotation of cross-sectional anatomy slice 12 in either direction. Keyway pin 48 engages circumferential keyway 50 when cross-sectional anatomy slice 12 is in the second position, so that it may be rotated to facilitate viewing.

Considering the weight range of a cadaver slice 12 (approximately twenty to thirty pounds), stainless steel or another material with similar strength and load characteristics is preferably used to form shaft 40 and tubing 44. To decrease the amount of friction, shaft 40 and tubing 44 have a smooth finish on the outside and inside surfaces, respectively. Optional lubricants may also be used if desired.

Figure 5:
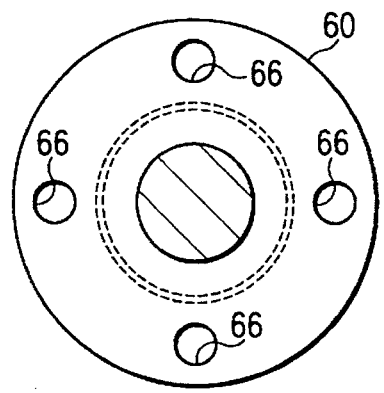
FIG. 5 is a front view of the rotating tension tension assembly.

Referring to FIG. 2 and also to structural details shown in FIGS. 4 and 5, anatomy table 10 further includes a rotation assembly 52, which includes a gear 54 having a plurality of teeth. Gear 54 is affixed to the end of tubing 44 and engages a tension assembly 56 when the cross-sectional slice is in the second position. Tension assembly 56 includes a spiral spring 58 coiled about but not touching shaft 40 and attached at one end to disc or washer 62 and the other end to a generally circular disc or washer 60. Alternatively as shown in FIG. 4, both ends of spring 58 may be welded to metal washers 60 and 62, of which washer 62 is affixed or bolted to table 10.

Gear 54 includes one or more dowel pins 64 protruding therefrom and pointing toward tension assembly 56. Washer 60 includes the same number of mating openings arranged in the same position and configuration as dowel pins 64 (four openings are shown in FIG. 5). When cross-sectional slice 12 is slid into the second position, dowel pins 64 enter into respective openings 66 to engage rotation assembly 52 with tension assembly 56. When cross-sectional anatomy slice 12 is rotated in either direction, tension assembly 56 provides a predetermined amount of torsional bias or resistance to partially support the weight of the slice. In this manner, each slice 12 may be safely rotated and locked into position by a locking assembly 70.

Locking assembly 70 is used to lock a cross-sectional slice 12 into a rotated viewing position or in an upright position. Locking assembly 70 includes a lever 72 coupled to a fulcrum 74. One end 76 of lever 72 is shaped so that it easily fits between two gear teeth to prevent gear 54 from turning in either direction. A biasing member 78 may be used to provide an upward force at lever end 80 which results in a downward force at end 76 so that it may not be accidentally disengaged from the gear teeth.

In operation, cross-sectional anatomy slices 12 are positioned upright and held in order on anatomy table 10. It may be preferable that the slices are aligned and centered about the midpoint of the slices. Alignment can be easily achieved by adjusting clamps 42. When an user wishes to look at a particular slice, he/she may pull the slice toward him/her into the second position until gear 54 engages tension assembly 56. While the slice is being pulled into position, longitudinal keyway 46 maintains the slice in concert with keyway pin 48 in the upright position. When gear 54 is engaged with washer 60, keyway pin 48 enters circumferential keyway 50, so that the user may rotate the slice in either direction. Locking lever 72 may require to be lifted free of the gear teeth when the slice is being rotated. A plurality of angular positions ranging from 10°–170° are available depending on the pitch of the gear teeth. Tension assembly 56 or spring 58 provides tension and support as the slice is rotated. When the desired rotational angle is reached, the locking lever 72 may be lowered onto the gear teeth to lock it in position. After viewing, the slice may be returned to the upright position and slid back into the first position in alignment with the other slices.

Constructed in this manner, the heavy and bulky cadaver slices are held and displayed in an accessible manner. The user may handle and change the viewing angle of selected slices without fear of dropping the slices. Further, the slices are displayed in order so that a more complete picture of the entire cadaver is also available.

Although the present invention and its advantages have been described in detail, it should be understood that various changes, substitutions and alterations can be made therein without departing from the spirit and scope of the invention as defined by the appended claims.

What is claimed is:

1. An anatomy table comprising:
   a substantially flat panel;
   a plurality of clamp assemblies each being slidably engaged in parallel and secured to said panel, each clamp assembly securely holding a cross-sectional anatomy slice substantially parallel with one another; and
   a plurality of rotation assemblies, each being coupled to one clamp assembly and being operable for rotating a cross-sectional anatomy slice to a plurality of predetermined angular viewing positions.

2. The anatomy table, as set forth in claim 1, wherein said flat panel further comprises a plurality of substantially parallel grooves formed therein, and said plurality of clamp assemblies being slidably engaged in said grooves.

3. The anatomy table, as set forth in claim 1, further comprising a tension assembly being selectively engageable with said rotation assembly for supplying and maintaining a predetermined amount of tension when a cross-sectional anatomy slice coupled thereto is being rotated into an angular viewing position or returned to an upright storage position.

4. The anatomy table, as set forth in claim 2, wherein said tension assembly prevents said cross-sectional anatomy slice coupled thereto from falling uncontrollably onto said top surface of the table.

5. The anatomy table, as set forth in claim 2, wherein said tension assembly includes a spring.

6. The anatomy table, as set forth in claim 2, further comprising a plurality of shafts each being fitted into one of said plurality of grooves and securely coupled thereto, each said clamp assembly being slidably engaged with one of said shaft.

7. The anatomy table, as set forth in claim 6, further comprising an elongated longitudinal keyway formed in an upper surface of each of said shafts extending a predetermined distance from a first end of said shaft.

8. The anatomy table, as set forth in claim 7, wherein said rotation assembly comprises:

a circumferential keyway formed in each said shaft at a predetermined distance from said first end thereof; and a plurality of tubular sleeves each fitting around one of said shafts, said tubular sleeves each having a pin protruding inwardly and being slidably engaged with said longitudinal keyway and said circumferential keyway, each said clamp assemblies securely fastening one cross-sectional anatomy slice to one of said tubular sleeves.

9. The anatomy table, as set forth in claim 8, further comprising a spring coiled about a second end of said shaft, said tubular sleeve being engageable with said spring when said tubular sleeve is slid along said shaft to said second end thereof, said spring providing torsional tension when said pin is being slid around said circumferential keyway for rotating said cross-sectional anatomy slice into a viewing position.

10. The anatomy table, as set forth in claim 8, further comprising a locking assembly coupled to each of said tubular sleeves for locking said cross-sectional anatomy slice into an angular viewing position.

11. The anatomy table, as set forth in claim 10, wherein said locking assembly includes:

a gear having a plurality of teeth being circumferentially arranged around each said shaft; and a locking device coupled to said table for selectively engaging said gear between two teeth to prevent further rotation thereof.

12. The anatomy table, as set forth in claim 11, wherein said rotational assembly rotates a cross-sectional anatomy slice to a plurality of positions defined by said plurality of gear teeth.

13. The anatomy table, as set forth in claim 11, wherein said locking device further includes a biasing device for ensuring said engagement of said locking device and said gear teeth.

14. The anatomy table, as set forth in claim 2, further comprising:

a plurality of shafts each being fitted into one of said plurality of grooves and securely coupled thereto, each said clamp assembly being slidably engaged with one of said shaft;

a plurality of tubular sleeves each fitting around one of said shafts, each said clamp assembly securely fastening one cross-sectional anatomy slice to one of said tubular sleeves;

a spring coiled about a second end of said shaft, said tubular sleeve being engageable with said spring when said tubular sleeve is slid along said shaft to said second end thereof, said spring providing torsional tension when a cross-sectional anatomy slice is being rotated into an angular viewing position.

15. The anatomy table, as set forth in claim 14, further comprising a locking assembly coupled to each of said tubular sleeves for locking said cross-sectional anatomy slice into said angular viewing position.

16. The anatomy table, as set forth in claim 1, further comprising a C-channel encased around each cross-sectional anatomy slice.

17. The anatomy table, as set forth in claim 1, wherein said rotational assembly rotates a cross-sectional anatomy slice to a plurality of positions where a maximum rotation is slice at least 90° in each direction.

18. The anatomy table, as set forth in claim 1, wherein said clamp assemblies are operable to accommodate cross-sectional anatomy slices of varying dimensions.

19. The anatomy table, as set forth in claim 1, further comprising:

at least four table legs coupled to said top table surface; and at least two casters coupled to two table legs.

20. A table for displaying a plurality of generally thin and flat panels, comprising:

a substantially flat top surface;

a plurality of substantially parallel grooves formed in said top surface;

a plurality of clamp assemblies each being slidably engaged in one of said grooves, a panel being securely held by each clamp assembly substantially in-line with said groove;

a plurality of rotation assemblies, each being coupled to one clamp assembly and being operable for rotating a panel to a plurality of predetermined angular viewing positions; and a locking assembly coupled to each said rotation assembly for locking said panels into said angular viewing position.

21. The table, as set forth in claim 20, further comprising a tension assembly being selectively engageable with said rotation assembly for supplying and maintaining a predetermined amount of tension when a panel coupled thereto is being rotated into an angular viewing position or returned to an upright storage position.

22. The table, as set forth in claim 21, wherein said tension assembly includes a spring.

23. The table, as set forth in claim 20, further comprising a plurality of shafts each being fitted into one of said plurality of grooves and securely coupled thereto, each said clamp assembly being slidably engaged with one of said shaft.

24. The table, as set forth in claim 23, further comprising a longitudinal keyway formed in an upper surface of each of said shafts extending a predetermined distance from a first end of said shaft.

25. The table, as set forth in claim 24, wherein said rotation assembly comprises:

a circumferential keyway formed in each said shaft at a predetermined distance from said first end thereof; and a plurality of tubular sleeves each fitting around one of said shafts, said tubular sleeves each having a pin protruding from an inner surface thereof and being slidably engaged with said longitudinal keyway and said circumferential keyway, each said clamp assemblies securely fastening one panel to one of said tubular sleeves.

26. The table, as set forth in claim 24, wherein said locking assembly is coupled to each of said tubular sleeves for locking said panel into an angular viewing position.

27. The table, as set forth in claim 26, wherein said locking assembly includes:

a gear having a plurality of teeth being circumferentially arranged around each said shaft; and a locking device coupled to said table for selectively engaging said gear between two teeth to prevent further rotation thereof.

28. The table, as set forth in claim 27, wherein said locking device further includes a biasing device for ensuring said engagement of said locking device and said gear teeth.

29. The table, as set forth in claim 20, further comprising:

a plurality of shafts each being fitted into one of said plurality of grooves and securely coupled thereto, each said clamp assembly being slidably engaged with one of said shaft;

a plurality of tubular sleeves each fitting around one of said shafts, each said clamp assembly securely fastening one cross-sectional anatomy slice to one of said tubular sleeves;

a spring coiled about a second end of said shaft, said tubular sleeve being engageable with said spring when said tubular sleeve is slid along said shaft to said second end thereof, said spring providing torsional tension when a cross-sectional anatomy slice is being rotated into an angular viewing position.

30. The table, as set forth in claim 20, further comprising a C-channel encased around each panel.

31. The table, as set forth in claim 30, wherein each said panel may be rigid or limp.

32. The table, as set forth in claim 20, wherein said rotational assembly rotates a cross-sectional to a plurality of positions where a maximum rotation is slice at least 90° in each direction.

* * * * *